(12) United States Patent
Angelopoulos et al.

(10) Patent No.: US 7,105,242 B2
(45) Date of Patent: Sep. 12, 2006

(54) CONTROL OF POLYMER SURFACE DISTRIBUTION ON DIFFUSION MEDIA IMPROVED FUEL CELL PERFORMANCE

(75) Inventors: Anastasios P Angelopoulos, Fairport, NY (US); Chunxin Ji, Rochester, NY (US); Mark F Mathias, Pittsford, NY (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/924,317

(22) Filed: Aug. 23, 2004

(65) Prior Publication Data

US 2005/0084742 A1    Apr. 21, 2005

Related U.S. Application Data

(60) Provisional application No. 60/512,238, filed on Oct. 17, 2003.

(51) Int. Cl.
*H01M 4/94* (2006.01)
*H01M 4/96* (2006.01)

(52) U.S. Cl. .............................. 429/13; 429/42; 429/44

(58) Field of Classification Search .................. 429/13, 429/30, 42, 44; 442/179; 428/408
See application file for complete search history.

(56) References Cited

U.S. PATENT DOCUMENTS

| | | | |
|---|---|---|---|
| 4,017,663 A * | 4/1977 | Breault | 429/12 |
| 6,350,539 B1 | 2/2002 | Wood, III et al. | 429/34 |
| 6,538,058 B1 * | 3/2003 | Kobayashi et al. | 524/495 |
| 6,573,004 B1 * | 6/2003 | Igarashi et al. | 429/217 |
| 2004/0124091 A1 * | 7/2004 | Hohenthanner et al. | 205/159 |

OTHER PUBLICATIONS

Mark Mathias et al., "Chapter 46, Diffusion media materials and characterisation", John Wiley & Sons, Ltd., 2003, pp. 1-21, month not applicable.

* cited by examiner

*Primary Examiner*—Stephen J. Kalafut
(74) *Attorney, Agent, or Firm*—Harness, Dickey & Pierce, P.L.C.

(57) ABSTRACT

Favorable performance of diffusion media in fuel cells has found to be correlated to a parameter (the C/F ratio) that relates to a spatial and thickness distribution of the hydrophobic fluoropolymer on the carbon fiber substrate structure of the medium. Suitable diffusion media may be chosen from among commercially coated diffusion media by measuring the C/F ratio by means of energy dispersive spectroscopy, and choosing the diffusion media if the value of the C/F ratio is within the preferred range. Alternatively, the diffusion media may be manufactured with an improved process that consistently yields values of C/F ratio in the desired range.

16 Claims, 4 Drawing Sheets

CONTROL OF POLYMER SURFACE DISTRIBUTION ON DIFFUSION MEDIA IMPROVED FUEL CELL PERFORMANCE

CROSS-REFERENCE TO RELATED APPLICATIONS

This applications claims the benefit of U.S. Provisional Application 60/512,238 filed Oct. 17, 2003.

FIELD

This invention relates to operation of fuel cells and fuel cell systems with improved water management. More particularly, the invention relates to methods for preparing diffusion media for use in fuel cell systems.

BACKGROUND

In proton exchange membrane (PEM) fuel cells, hydrogen is supplied to the anode and oxygen is supplied as the oxidant to the cathode. The overall reaction consumes hydrogen at the anode and produces water (product water) at the cathode. PEM fuel cells include a membrane electrode assembly (MEA) comprising a thin, proton transmissive non-electrically conductive solid polymer electrolyte membrane having the anode on one of its faces and the cathode on the opposite face. The MEA is sandwiched between a pair of electrically conductive elements which 1) serve as current collectors for the anode and cathode, and 2) contain appropriate channels and/or openings for distributing the fuel cells gaseous reactants over the surfaces of the respective anode and cathode catalysts. A plurality of individual cells are commonly bundled together to form a PEM fuel cell stack. The term fuel cell is typically used to refer to either a single cell or a plurality of cells (stack) depending on the context.

Efficient operation of the fuel cell depends on the ability to effectively disperse reactant gases at catalytic sites of the electrode where reaction occurs. In addition, effective removal of reaction products is required so as to not inhibit the flow of fresh reactants to the catalytic site. Therefore, it is desirable to improve the mobility of reactant and product species to and from the MEA where reaction occurs.

Gas diffusion media play an important role in PEM fuel cells. Generally disposed between catalytic electrodes and flow field channels in the fuel cell, they provide reactant and product permeability, electronic conductivity, and heat conductivity, as well as mechanical strength needed for proper functioning of the fuel cell. One of its most important functions is water management. For example, the diffusion media prevents flooding by wicking product water away from the catalyst layer while maintaining reactant gas flow from the bipolar plate through to the catalyst layer. The gas diffusion media are generally constructed of carbon fiber containing materials.

Although carbon fibers are themselves relatively hydrophobic, it is usually desirable to increase the hydrophobicity or to at least treat the carbon fiber with a coating to give a more stable hydrophobic coating. Adding a hydrophobic agent such as polytetrafluoroethylene (PTFE) to the carbon fiber diffusion media is a common process for increasing and/or stabilizing the hydrophobicity. This process is normally done by dipping carbon fiber papers into a solution that contains PTFE particles and surfactants.

Even though coating the diffusion media with PTFE generally improves cell performance, existing processes for preparing the coated diffusion media results in diffusion media having inconsistent results. Such inconsistent results may manifest themselves for example, in fuel cells wherein the voltage of the cell is undesirably dependent on the amount of gas flow.

It would therefore be desirable to provide fuel cells having improved consistent performance. It has been surprisingly discovered that the performance of fuel cells can be noticeably improved by providing the fuel cells with water management through the use of specially prepared gas diffusion media.

SUMMARY

A method of operating a fuel stack is provided wherein each cell of the stack contains a fluororesin-coated diffusion medium disposed between the cathode and the flow field. The surface of the diffusion medium exposed to the flow field is characterized by a surface fluorine distribution such that it exhibits a C/F ratio within a preferred range of values, as measured by energy dispersive spectroscopy. Commercially available diffusion media can be sorted by measuring the C/F ratio by means of energy dispersive spectroscopy before selecting the diffusion media to make up the cell. Alternatively, the diffusion media having a desirable C/F ratio indicating an optimum surface distribution of fluorine may be prepared by a process including the step of drying the diffusion media with electromagnetic radiation of a wavelength greater than visible light such as infrared, microwaves, or radio frequency.

Accordingly, a method for preparing a fluorine coated carbon fiber based substrate is provided, that contains the steps of applying a polymer composition and a solvent to at least one surface of the substrate, and removing the solvent from the substrate to leave a deposited film. The polymer composition contains a fluoropolymer, and the rate of removal of the solvent is slower than would be achieved by simply heating the coated substrate at a temperature above the boiling point of the solvent. PEM fuel cell diffusion media produced by such a process have been found to more consistently give favorable results during fuel cell operations.

Favorable performance of diffusion media in fuel cells has found to be correlated to a parameter (the C/F ratio) that relates to a spatial and thickness distribution of the hydrophobic fluoropolymer on the carbon fiber substrate structure of the medium. Suitable diffusion media may be chosen from among commercially coated diffusion media by measuring the C/F ratio by means of energy dispersive spectroscopy, and choosing the diffusion media if the value of the C/F ratio is within the preferred range. Alternatively, the diffusion media may be manufactured with an improved process that consistently yields values of C/F ratio in the desired range.

Further areas of applicability of the present invention will become apparent from the detailed description provided hereinafter. It should be understood that the detailed description and specific examples, while indicating various embodiments of the invention, are intended for purposes of illustration only and are not intended to limit the scope of the invention.

DETAILED DESCRIPTION

Figure 1:
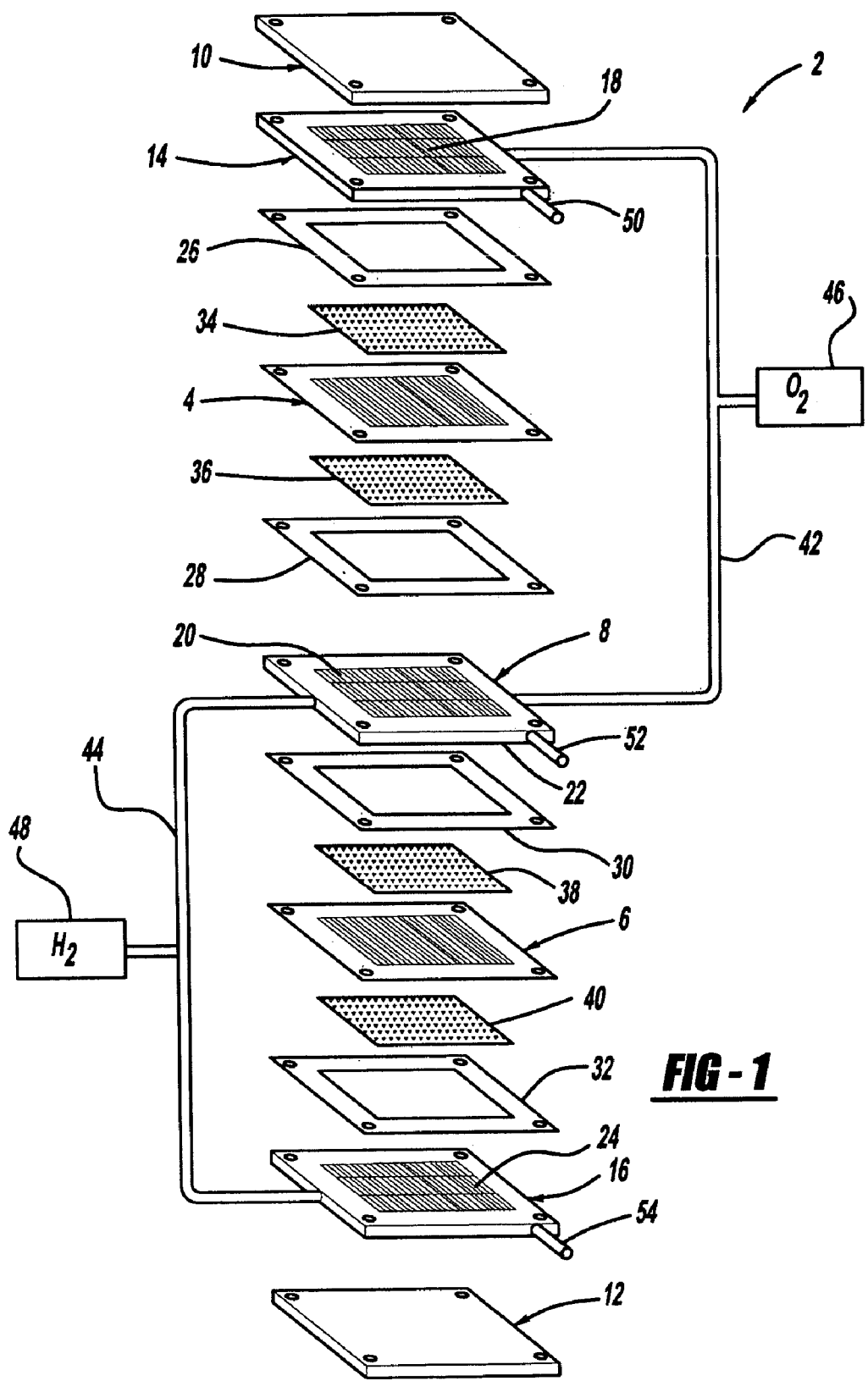
FIG. 1 is a schematic diagram of a fuel cell stack

The invention provides a method of operating a PEM fuel cell stack. The fuel cell stack contains a plurality of fuel cells, each cell containing an anode, a cathode, and an electrically conductive carbon fiber based diffusion medium disposed between the cathode and a flow field of the cell. The fuel cell is operated conventionally by supplying hydrogen to the anode and oxygen to the cathode. The diffusion media in the cells are characterized by a C/F ratio of from 8 to 20, preferably from 9 to 15, and most preferably within the range of 9 to 13, as measured by energy dispersive spectroscopy on the surface of the media that is exposed to the flow field. In some embodiments, each cell in the stack contains diffusion media with such a C/F ratio. The use of diffusion media having a consistent surface fluorine distribution as evidenced by a C/F ratio in the preferred range leads to cells that exhibit a relatively constant voltage over a wide range of flow rates. In particular, the voltage of such a cell can vary less than 10% over a range of stoic from 1.3 to 1.8.

The fuel cells of the fuel stacks of the invention contain an anode, a cathode, a proton exchange membrane (PEM) disposed between the cathode and the anode, a flow field adjacent the cathode, and a fluororesin coated diffusion medium disposed between the cathode and the flow field. Additionally they contain a flow field adjacent the anode and a diffusion medium disposed between the anode and the anode flow field. A first surface of the diffusion medium is in contact with the cathode and a second surface is exposed to the flow field. The diffusion medium is characterized by preferred C/F ratios indicating the surface and thickness distribution of the fluorine.

A method for preparing fluorine coated carbon fiber based substrates such as those for use as diffusion media in PEM fuel cells is also provided. The method contains the steps of applying a polymer composition comprising a fluorocarbon polymer in a solvent to at least one surface of the carbon fiber based substrate. Thereafter, the solvent is removed from the substrate to leave a deposited film on the substrate. The rate of removal of the solvent is generally slower than would be achieved by heating the coated substrate at, near, or above the boiling point of the solvent. The C/F ratio of the coated substrate is measured to be 8 or greater by energy dispersive spectroscopy. In preferred embodiment, the C/F ratio is 9 or greater.

In some embodiments, the solvent is removed by heating below the boiling point of the solvent, for example in a quiescent convection oven. Preferably the heating is carried out at a temperature 20° to 30° below the boiling point of the solvent. In the example of water, it is preferred that the maximum temperature of heating be 70° C. or less and preferably 60° C. or less.

In other embodiments, the solvent is removed by a process including the step of exposing the substrate to electromagnetic radiation having a wavelength above that of visible light, at an intensity and for a time sufficient to remove solvent, such as water, from the carbon fiber based medium. Suitable electromagnetic radiation for removing the solvent includes infrared radiation, far infrared radiation, microwave radiation, and radio frequency. In a preferred embodiment, solvent is removed by exposing the substrate to microwave radiation. In another embodiment, the solvent is removed by exposing the substrate to infrared radiation.

The substrate is a carbon fiber based substrate. In one embodiment, the substrate is a carbon fiber paper, and in another embodiment, the substrate may be a carbon fiber fabric.

The fluorine coated carbon fiber based substrate, such as a hydrophobic diffusion medium for use in PEM fuel cells, is produced by applying a polymer composition to at least one surface of the substrate. The polymer composition contains a fluorocarbon polymer and a solvent. A preferred solvent is water. Preferably, the polymer composition additionally contains a surfactant. Thus, in preferred embodiments, aqueous dispersions of polymers such as fluorocarbons are provided. The aqueous dispersion may further contain an organic solvent. In a preferred embodiment, the fluorocarbon is polytetrafluoroethylene (PTFE).

Carbon fiber diffusion media for use in the fuel cells of the invention may also be prepared by selecting them from among a population of diffusion media that have been coated with fluorine-containing polymers by other methods. In general, the selection method involves measuring the C/F ratio of a candidate diffusion medium with energy dispersive spectroscopy. The candidate diffusion medium is selected for use in the fuel cell if the value of C/F ratio is greater than 8, or preferably greater than 9. The diffusion medium so selected is then installed in the fuel cell. Preferably the C/F ratio of the diffusion medium is from 8 to 25, from 9 to 20, from 9 to 15, or from 9 to 13.

Energy dispersive spectroscopy (EDS) is a surface analytical technique wherein electrons are directed against a surface and X-rays are excited. The excited x-rays released from the surface have wavelengths that are unique to the element that produces the x-ray. The EDS method detects elements present on the surface of the substrate to within the depth of the penetration of electrons. The depth of penetration depends on the material being examined, but it generally ranges from a few microns up to 8 microns or more. In the case of carbon fiber based electroconductive media such as for use in PEM fuel cells as diffusion media, the elements to be detected include the carbon from the carbon fiber as well as from the fluorocarbon polymer, and of course the fluorine of the fluorocarbon polymer itself. It is convenient to express the results of the surface analysis in a parameter called the C/F ratio. A low C/F ratio indicates that the surface contains a high amount of fluorine, while a high C/F ratio indicates a low coverage of fluorine on the substrate. Along these lines, it may be noted that the measured fluorocarbon itself would have a (in the example of polytetrafluoroethylene) C/F ratio of ½ or 0.5, because the fluorocarbon polymer contains 2 fluorine atoms for every carbon atom in the polymer chain.

The EDS method may be used to obtain C/F ratios over the entire surface of the substrate or over selected areas of the substrate. The method thus gives a spatial as well as a thickness distribution of fluorine over the surface. By the method, fluorine may be detected in the first five μm or preferably the first 2 μm of carbon fibers that may have a diameter of, for example, 7–8 μm.

It has been surprisingly found that carbon fiber diffusion media having C/F ratios as measured by EDS in the preferred ranges lead to better and more consistent performance in fuel cells. Although a theoretical understanding of why the invention works is not necessary to practicing the invention, it may be noted that the carbon fiber based diffusion media such as carbon fiber paper generally consists of carbon fiber held together by regions of a carbonized binder. Typically, the papers are produced by combining carbon fibers with a binder such as a phenolic resin. In the process of making the paper, the resin is carbonized by heating the paper to as high as 2800° C. The result is a carbon paper characterized by areas of carbon fibers and by areas of binder.

Carbon fiber diffusion media of the prior art were made by dipping a substrate such as a carbon fiber paper into an aqueous solution containing particles of fluorocarbons such as PTFE. During immersion of the paper in the PTFE dispersion, particles of fluorine containing polymer are imbibed within the porous carbon fiber paper, and the solution covers both the binder regions and the carbon fibers. It is believed that when solvent is rapidly removed by heating at a temperature above the boiling point of the solvent, at least a portion of the PTFE particles form a large deposit or puddle of particles on the binder forming an island of 1–2 μm thick supported on the binder. These puddles or relatively thick deposits of PTFE are formed during the solvent drying process and remain in the same position during the high temperature (>350° C.) PTFE sintering process that follows the drying process. These high concentrations or puddles of PTFE are then detected by EDS and exhibit a relatively low ratio of carbon to fluorine. This is because the EDS method "sees" almost pure PTFE on the binder regions, which would have a C/F ratio of about 0.5 as discussed above. It has been observed that low performance cells can be correlated to either very low or very high surface C/F ratio detected by the EDS method. In this regard, it should be noted that a coated diffusion medium may have a percentage fluorine in an acceptable or preferred range when considering the overall composition of the diffusion media, yet the C/F ratio may be outside the preferred range of the invention because of situations such as described above. It should be also noted that C/F ratios at the upper limit of the preferred range or those C/F ratios outside the preferred range correspond to areas where there is insufficient fluorine to give optimum results. Thus, the cells, method, and diffusion media of the invention are based in part on a recognition that a particular optimum surface and thickness distribution of fluorine on the carbon fiber substrate is needed for optimum performance. It is believed that the methods of the current invention achieve relatively uniform coatings of fluorine over fiber and binder surfaces, whereas other methods result in pooling of the fluorine in certain regions on the surface, leaving individual fibers with less than optimum coating.

Pre-screening of papers using EDS to select those with preferred C/F ratios has led to elimination of low performance for cells especially in the cells most susceptible to low performance (for example, the end cells). In some embodiments, the papers may be pre-sorted utilizing EDS. That is, commercially available coated carbon fiber substrates may be measured with EDS to determine if an individual diffusion medium falls within a preferred range of C/F ratio. However, although useful, the procedure is time consuming, and tends to lead to waste, in that only a small fraction (typically 20–50%) of commercially available papers have been found to have a C/F ratio in a preferred range.

In cells or fuel cell stacks observed to have less than optimum performance, it has been observed that at least one of the carbon fiber diffusion media has a C/F ratio on the cathode flow field side of 6–7 or lower. When the diffusion media are measured to have a C/F ratio of about 8, the performance of the cell is improved. Generally, it has been found that consistently good results are obtained from cells built with carbon fiber diffusion media pre-sorted to have a C/F ratio of at least 9. In addition to measuring the C/F ratio with EDS, the carbon fiber papers may be observed using fluorine maps produced using a Scanning Electron Microscope combined with EDS capability to observe whether the fluorine is distributed evenly along the fibers, or is instead held predominantly on binder regions. As discussed above in the latter case, the measured C/F ratio would be on the low side of the preferred range.

Carbon fiber diffusion media are installed in the cell between the cathode and the flow field, with a fluorine-coated side facing the flow field. Under low flow (low current), water tends to accumulate in the flow field channels if the carbon fiber diffusion medium is not fluorine coated. For this reason, at least the side of the diffusion medium facing the flow field should be coated with fluorocarbon to obtain a C/F ratio in the preferred ranges.

During the process of making the diffusion media of the invention, the fluorocarbon may be applied to one or both sides of the substrate. Although the diffusion medium may be used in the fuel cell with the fluorocarbon on both sides of the paper, in some embodiments it is preferred to grind off a portion of one side of the diffusion media and to put the ground side against the catalyst layer, while leaving the side of the diffusion medium exposed to the flow field with a fluorocarbon coating characterized by the disclosed C/F ratios above. In some embodiments, the side facing the catalyst is provided with a microporous layer, in which carbon or graphite particles are mixed with a polymeric binder and applied as a surface layer. The microporous layer provides effective wicking of liquid water from the cathode catalyst surface into the diffusion media. Suitable polymeric binders includes fluorocarbon polymers such as, without limitation, PTFE and polyvinylidene fluoride. The microporous layers may be applied by a number of methods, including blade doctoring, screen printing, spraying, and rod coating. In one aspect, when the fluorine coating applied to both sides of the substrate is removed from one side only of the substrate for use in fuel cells, a substrate is provided wherein the C/F ratio on one side is in the ranges and preferred ranges as such above, while the C/F ratio on the other side is 20 or more and preferably 25 or more, indicating a very low coverage of fluorine on that side.

Diffusion media of the invention are used in fuel cells to improve cell performance. FIG. 1 is an expanded view showing some details of the construction of a typical multi-cell stack, showing just two cells for clarity. As shown, the bipolar fuel cell stack 2 has a pair of membrane electrode assemblies (MEA) 4 and 6 separated from each other by an electrically conductive fuel distribution element 8, hereinafter bipolar plate 8. The MEA's 4 and 6 and bipolar plate 8 are stacked together between stainless steel clamping plates or end plates 10 and 12 and end contact elements 14 and 16. The end contact elements 14 and 16, as well as both working faces of the bipolar plate 8, contain a plurality of grooves or channels 18, 20, 22, and 24 respectively, for distributing fuel and oxidant gases (i.e. hydrogen and oxygen) to the MEA's 4 and 6. Non-conductive gaskets 26, 28, 30, and 32 provide seals and electrical insulation between several components of the fuel cell stack. Gas permeable conductive materials are typically carbon/graphite diffusion papers 34, 36, 38, and 40 that press up against the electrode faces of the MEA's 4 and 6. The end contact elements 14 and 16 press up against the carbon graphite diffusion media 34 and 40 respectively, while the bipolar plate 8 presses up against the diffusion medium 36 on the anode face of MEA 4, and against carbon graphite diffusion medium 38 on the cathode face of MEA 6. Oxygen is supplied to the cathode side of the fuel cell stack from storage tank 46 by appropriate supply plumbing 42, while hydrogen is supplied to the anode side of the fuel cell from storage tank 48, by appropriate supply plumbing 44. Alternatively, ambient air may be supplied to the cathode side as an oxygen source and hydrogen may be supplied to the anode from a methanol or gasoline reformer. Exhaust plumbing (not shown) for both the hydrogen and oxygen sides of the MEA's 4 and 6 will also be provided. Additional plumbing 50, 52, and 54 is provided for supplying liquid coolant to the bipolar plate 8 and end plates 14 and 16. Appropriate plumbing for exhausting coolant from the coolant bipolar plate 8 and end plate 14 and 16 is also provided, but not shown.

Figure 2:
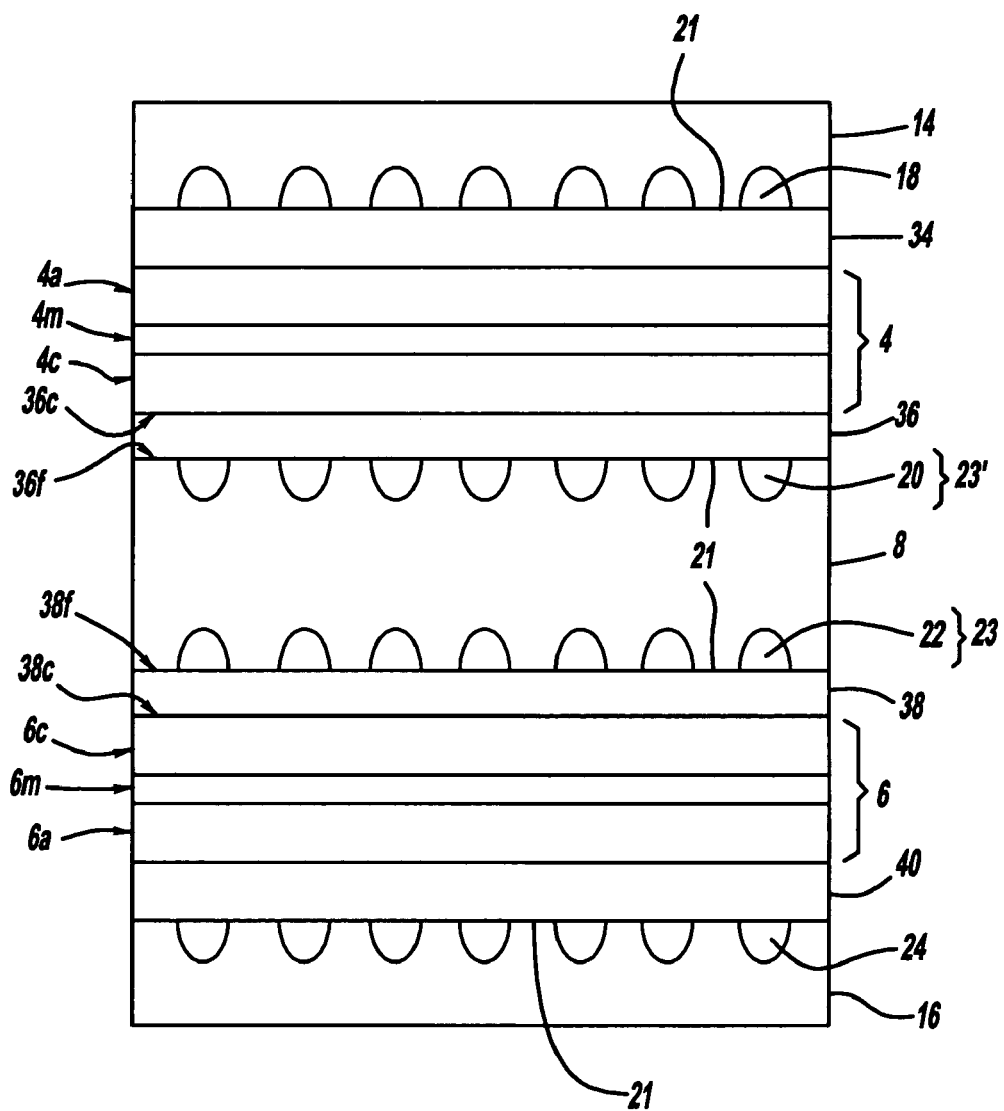
FIG. 2 is a cross-sectional drawing of two fuel cells.

FIG. 2 shows a cross-sectional view of two cells of FIG. 1 after assembly. MEA 4 is further depicted as containing a proton exchange membrane 4m sandwiched between an anode 4a and a cathode 4c, while similarly MEA 6 contains a PEM 6m between an anode 6a and a cathode 6c. Diffusion media 34 and 40 are provided on the anode side of MEA's 4 and 6 respectively. Diffusion media 36 and 38 of the invention are provided between the cathodes 4c and 6c respectively and flow fields 23' and 23 respectively. The side of the diffusion medium 36 facing the cathode is designated as 36c, while the side of the diffusion medium 36 exposed to the flow field 23' is designated as 36f. The flow field 23' is made up of flow channels 20 and lands 21 in the bipolar plate 8, while the flow field 23 is made up of flow channels 22 and lands 21.

Similarly, diffusion medium 38 of the invention is shown with a side 38c facing the cathode 6c of MEA 6 and a side 38f facing the flow field 23 of the bipolar plate 8. Preferably, diffusion media 36 and 38 are coated with fluorocarbon on side 36f and 38f respectively, wherein the coating is characterized by a C/F ratio in the ranges discussed above, as measured by energy dispersive spectroscopy.

In one aspect, the invention provides a diffusion medium for a PEM fuel cell which is a multilayer gas distribution structure. The layers of the multilayer diffusion structure have selected chemical and physical properties. Together the layers facilitate transport of reactant gas to the electrode while improving water management.

Water management in the cell is important and key to successful long-term operation. The diffusion structure aids in water management in the cell. Concentrating on the diffusion media 36 and 38 of the invention, the diffusion media have several specific functions. They provide reactant gas access from flow field channels to catalyst layers including in-plane permeability to regions adjacent to the lands. It further provides for passage or removal of product water from the cathode area to flow field channels, also including in-plane permeability from the region adjacent to the lands. In addition, as noted above, the media provide for electrical conductivity and heat conductivity to provide for optimum operation of the cell. In particular, the diffusion media 36 and 38 operate to remove product water from the cathodes 4c and 6c and to release water into the flow fields 23 and 23'.

PEM fuel cells according to the invention have diffusion structures 34, 36, 38, and 40 adjacent or engaging both the cathode and anode so that the surface of the electrode reaction layers 4a, 4c, 6a, and 6c are utilized (see FIGS. 1 and 2). The diffusion structures act as diffusion media to cooperate with the electrodes and the rigid non-porous material used for plates 8, 14, and 16, which have flow field channels (grooves) 18, 20, 22 and 24. The flow field channels and the lands 21 define the flow field. The electrons are conducted through the lands 21 that define the channels of the flow fields within the bipolar plate 8 and the end plate 14 and 16. If there were no diffusion structure, the lands 21 would block gas transport to the portions of the electrode layers they engage and prevent access by their respective hydrogen and oxygen reactants.

The diffusion structures also protect the electrode reaction layers 4a, 4c, 6a, and 6c by keeping their delicate structures intact and providing structural support for the perimeter area of the membranes 4m and 6m. Introduction of the diffusion media into the PEM fuel cell effectively adds a mass transport barrier and an additional interface to both the anode and the cathode. Hence, the cathode diffusion structure must be constructed and arranged to transport excess liquid water in the opposite direction of the vapor phase reactant flux, without significantly inhibiting vapor transport. This is particularly the case when the operating temperature is low (less than about 80° C.), the operating pressure is high (greater than about 200 kPa), or the cathode relative humidity is greater than about 25%. The higher the pressure and the lower the temperature, the lower will be the ability of the water to enter into the vapor phase. Such a situation can result in deleterious flooding conditions at the cathode site, especially at high current densities.

PEM fuel cells perform better with increasing pressure, and the typical automotive system requires that the PEM fuel cell stacks operate at greater than about 0.8 A/cm$^2$ to make enough power. A further design challenge is that as long as the PEM itself requires a mobile phase to be sufficiently ionically conductive (i.e. transporting protons at a sufficient rate to sustain the electroreduction of oxygen molecules), then liquid water will often be present to some extent directly adjacent the membrane. The end conclusion is that if a PEM fuel cell stack is to provide sufficient power for an automotive system while operating at higher pressures and higher current densities using current PEM membrane materials, there must be present a cathode diffusion structure that can remove practically all of the liquid water at the cathode not required and absorbed by the membrane. The diffusion structure and its interfaces with the electrode layers 4c and 6c and lands 21 must also remain electrically conductive while performing all these functions.

Liquid water build up at the cathode arises from the generation of water molecules by the oxygen electroreduction reaction occurring within the cathode reaction layers 4c and 6c and in the accumulation of water molecules transported across the membranes 4m and 6m from the anode catalysts layers 4a and 6a by proton electro-osmosis. If a large amount of hydraulic pressure is required to move a local volume element of water, localized flooding of the cathode catalyst layers and/or cathode diffusion media may also be occurring.

Figure 3:
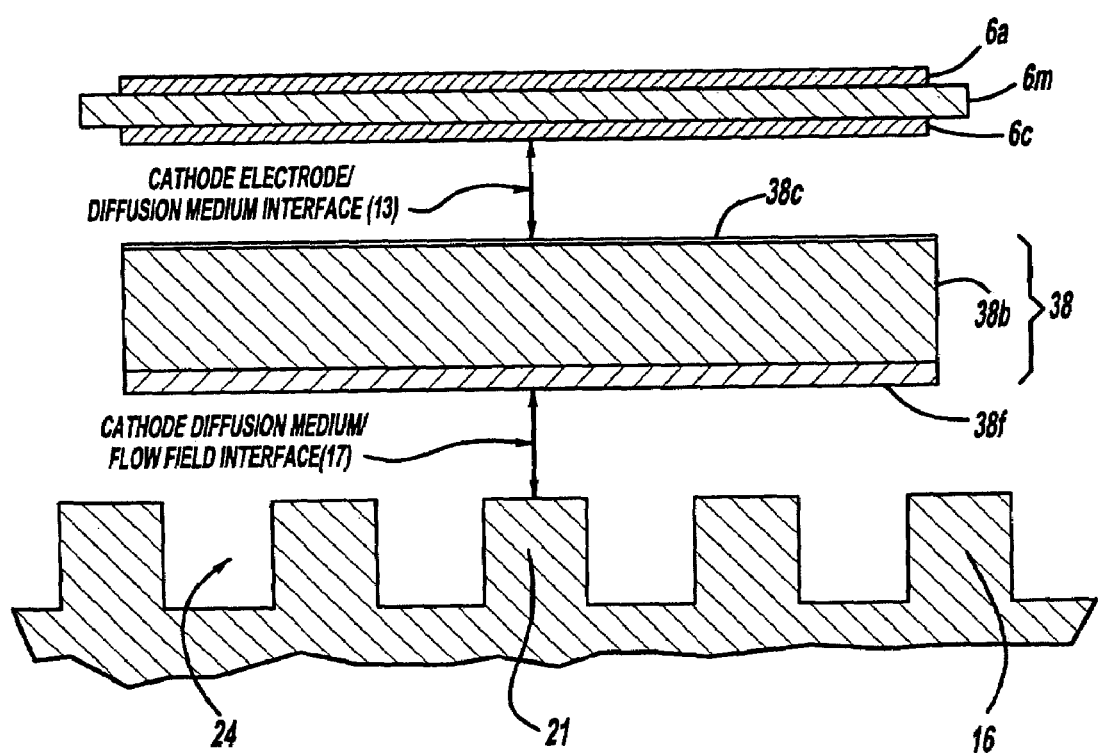
FIG. 3 shows a detail of a diffusion medium disposed between the cathode and flow field in a fuel cell.

In an embodiment illustrated in FIG. 3, water removal at the cathode may be accomplished by inducing a surface energy gradient between the electrode interface 13 and the flow channel interface 17. This gradient allows liquid water to be "wicked" away from the cathode surface and released from the diffusion medium on the side away from the cathode and exposed to the flow field. Multi-layering of the cathode diffusion structure to achieve this gradient is described in Wood III et al., U.S. Pat. No. 6,350,539, the disclosure of which describes useful background for the invention and is incorporated by reference. A multi-layered diffusion structure 38 contains two outer layers 38c and 38f adjacent to the electrode and flow channel interfaces respectively, and enclosing one or more center layers 38b. In addition to their water handling abilities at the electrode and flow channel interfaces, the material of the outer layers reduces the contact resistance inherent to the cathode diffusion material. The region adjacent to the electrode interface 13 is the adsorption layer 38c and is preferably characterized by relatively low hydrophobicity, low mean pore size, high surface area, and high porosity. The region adjacent to the flow field plate 16 is the desorption region 38f and is preferably characterized by relatively high hydrophobicity. A region between the adsorption layer 38c and the desorption layer 38f is a bulk transport layer 38b. It may be characterized by properties intermediate between the absorption layer and the desorption layer, or may have properties similar to one or the other or both.

According to the invention, the desorption layer 38f is preferably characterized by having a C/F ratio in the range of 8–20 as determined by EDS on a representative sample of the surface. Preferably the C/F ratio is at least 9, with a preferred range being 9–15, more preferably 9–13. It has been found that consistent cell results may be obtained when the diffusion media are characterized by such C/F ratios.

Diffusion media of the invention are prepared from carbon fiber based substrates. In some embodiments, the carbon fiber based substrates are characterized as carbon fiber paper, while in other embodiments, the substrates are provided as a carbon fiber based cloth. Carbon fiber papers are available commercially, for example from Toray in Japan and from Spectra Corp. in the United States. Carbon cloths are also commercially available, for example from Ballard Material Products in the United States.

Carbon fiber based papers may be made by a process beginning with a continuous filament fiber of a suitable organic polymer. After a period of stabilization, the continuous filament is carbonized at a temperature of about 1200° C.–1350° C. and chopped to provide shorter staple carbon fibers. Thereafter, the staple fibers are impregnated with an organic resin and molded into sheets. The molded sheets may then be carbonized or graphitized at temperatures above 2000° C. to form the carbon fiber paper. Suitable carbon fiber based substrates are described, for example in Chapter 46 of Volume 3 of Fuel Cell Technology and Applications, John Wiley & Sons, (2003), the disclosure of which is helpful for background and is incorporated by reference. The substrates may take the form of carbon fiber paper, wet laid filled paper, carbon cloth, or dry laid filled paper.

For paper production, the carbon fibers are impregnated with a carbonizable thermoset resin. Generally any thermoset resin may be used. Phenolic resins are preferred because of their high carbon yield and relatively low cost. After a final carbonization or graphitization the carbon fiber papers have a structure characterized as carbon fibers held together with a binder. The binder is made up of the carbonized thermoset resin.

A fluorine coating is applied to the carbon fiber based substrate by applying a polymer composition to at least one surface of the substrate. The polymer solution contains a fluorocarbon polymer, a solvent, and surfactants. In a preferred embodiment, the solvent comprises water, so that the polymer composition may be described as a fluorocarbon dispersion.

A preferred fluorocarbon polymer is polytetrafluoroethylene (PTFE). PTFE is preferred in some embodiments because of its wide availability and relatively low cost. Other fluorine-containing polymers may also be used. Suitable fluorocarbon polymers include without limitation PTFE; FEP (copolymers of hexafluoropropylene and tetrafluoroethylene); PFA (copolymers of tetrafluoroethylene and perfluoropropylvinylether); MFA (copolymers of tetrafluoroethylene and perfluoromethylvinylether); PCTFE (homopolymers of chlorotrifluoroethylene); PVDF (homopolymers of vinylidene fluoride); PVF (polymers of vinylfluoride); ETFE (copolymers of ethylene and tetrafluoroethylene); and THV (copolymers of vinylidene fluoride, hexafluoropropylene, and tetrafluoroethylene). Aqueous dispersions of these and other fluorocarbons are commercially available, for example from DuPont. The dispersions may be conveniently prepared by emulsion polymerization of fluorine-containing and other monomers to form the polymers. Alternatively, the dispersions may be made by combining polymer powder, solvent, and surfactants. The polymer composition may comprise from 1–90% by weight of the fluorocarbon polymer with the balance comprising water and surfactant. For example, DuPont T30 PTFE solution is available containing 60% by weight PTFE.

The solvent is preferably water, and may further contain organic solvents. In a preferred embodiment, the solvent is water. A wide variety of surfactants may be used, as long as they can maintain the fluorocarbon polymer particles in a stable dispersion and permit penetration of the solution into the pores of the diffusion media. Non-limiting examples of surfactants include nonylphenol ethoxylates, such as the Triton series of Rohm and Haas, and perfluorosurfactants.

The coated diffusion media are prepared by applying the polymer composition to at least one surface of the substrate. The polymer composition may be coated on both sides of the substrate by immersing the carbon fiber paper or cloth into the fluorocarbon dispersion. In a typical procedure, the substrate may be dipped into the fluorocarbon dispersion and removed after a time of soak. In other embodiments, the polymer composition may be applied to only one surface of the substrate, for example, by spraying. The exposure of the substrate to the fluorocarbon polymer dispersion occurs for a time sufficient to provide the substrate with the proper amount of fluoropolymer. A wide range of loadings of PTFE or other fluorocarbon may be applied to the carbon fiber substrate. In some embodiments, it is desirable to incorporate about 2 to 30% fluorine by weight of the diffusion medium, the percent fluorine being measured after the drying and other steps noted below. In other embodiments, at least 5% by weight fluorine is incorporated into the diffusion medium. Typically the substrates may be dipped or immersed in the fluorocarbon dispersion for a few minutes up to a few hour to obtain an appropriate loading of fluorocarbon on the substrate. Typically the dispersion into which the substrate is dipped or immersed contains from 1% to 50% by weight of fluorocarbon particles. Dispersions having concentrations of particles in the preferred range may be made by diluting commercial sources of the dispersions as necessary to achieve the desired concentrations. In a non-limiting example, a dispersion containing 60 weight PTFE may be diluted 20 times with de-ionized water to produce a dispersion containing 3% by weight PTFE particles.

As noted above, the time of exposing the substrate to the fluorocarbon polymer dispersion is long enough for resin particles to imbibe into the pores of the carbon fiber paper or cloth, yet short enough to be an economically viable process. Similarly, exposure of the dispersion to the substrate at room temperature is preferred. Higher temperatures may be used but in some embodiments are less preferred because of expense. Generally, the time of soaking and the concentration of the fluorocarbon polymer particles, as well as the nature of the resin, may be varied and optimized to achieve desired results.

After applying the polymer composition to at least one surface of the substrate, it is preferred to remove excess solution before further processing. In one embodiment, the substrate may be removed from the liquid dispersion and the excess solution allowed to drip off. Other processes are possible, such as rolling, shaking, and other physical operations to remove excess solution.

The diffusion medium is then dried by removing the solvent. The solvent is removed at a rate less than what would be achieved by heating the substrate above the boiling point of the solvent. In the case of water as the solvent, it is preferred to remove the solvent at a temperature below 70° C., preferably below 60° C. and more preferably below 50° C.

Removal of the solvent may be achieved by heating in a quiescent oven (i.e. without significant air flow) or, in other embodiments, exposing the diffusion medium to electromagnetic radiation having a wavelength above that of visible light. Such radiation is believed to warm the diffusion medium by exciting the constituent molecules, and for convenience is divided into infrared, microwave, and radio frequencies.

The substrate is dried at a suitable slow rate. In some embodiments, the substrate may be heated to temperatures approaching and above the boiling point of the solvent, as long as the final period of drying, that is the period just before all the solvent is removed, takes place at the lower temperatures described above. For example, in this embodiment, the diffusion medium may be partially dried above the boiling point of water, but cooled below 70° C. before removing the last bit of water from the diffusion medium.

In a preferred embodiment, the heating to dry the diffusion medium is accomplished by exposure to electromagnetic radiation. A preferred electromagnetic radiation is microwave. As used here, microwave radiation includes frequency ranges from about 500 MHz to about 1000 GHz. At the upper ranges of these frequencies, the radiation may be referred to as far infrared. Preferably, frequency is from about 500 MHz to about 100 GHz, and more preferably from about 500 MHz to 10 GHz. In a preferred embodiment, frequency ranges from about 800 MHz to about 3 GHz. Commercially available microwave generators are readily available that have radiation frequencies of 900 MHz and 2.45 GHz. Power distribution in such commercially available microwave generators ranges from about 500 W to about 200 kW.

The heating may also be carried out with radio frequency heating. As used here, radio frequency heating involves frequencies from about 1 MHz to about 100 MHz, preferably from 10 MHz to 50 MHz. Preferred frequencies for radio frequency heating are those approved by governmental authorities for industrial use, for example 13.56 MHz, 27.12 MHz, and 40.68 MHz. Desirably, the power output of an RF heater is from about 10 kW to about 100 kW.

In other embodiments, the heating of the diffusion medium to remove solvents is accomplished with infrared heating. Infrared heaters operate in a frequency range above the visible, with a cutoff of 0.76 microns usually accepted as defining the infrared range. Infrared panel heaters are commercially available. Radiant heaters, also known as spot heaters or space heaters, operate by emitting light from a body heated by electric resistance. Radiant heaters operate at a variety of wavelengths. Commercial heaters are available that operate at peak emissions of 1–1.1 microns, at about 3 microns, and at about 5 microns. Gas radiant infrared heaters may also be used. For removing water, it is preferred to operate the infrared heaters at about 3 microns or above, so that the light will be efficiently absorbed by the water.

In a typical procedure, the front of an IR heater is made of black cloth to enable homogeneous heating. The temperature of the wet carbon fiber paper surface can be adjusted both by the IR heater power controller and by adjusting the distance of the heater from the paper. In a non-limiting example, the IR panel heater may be placed about 60 cm above the carbon paper. Preferably, the temperature on the sample surface during IR heating is less than 70° C. (when used with an aqueous dispersion).

After the diffusion medium is dried as described above, the diffusion medium may be subjected to a further heat treatment. In a preferred embodiment, a two step heat treatment process is carried out. In a first step, the diffusion media is heated up to about 290° C. to remove surfactant. Thereafter the diffusion medium is heated to a temperature just below the decomposition temperature of the fluorocarbon polymer. For example, when the fluorocarbon polymer is PTFE, the second heat treating step may be carried out at a temperature of about 390° C. The heating to just below the decomposition of the fluoropolymer enhances adhesion of the fluoropolymer to the carbon fiber substrate.

It is preferred to avoid heating to dryness in a conventional hot air convection oven. As a wet carbon fiber substrate is dried in a convection oven, the air flow tends to pull the liquid away from the surface. As the solvent evaporates, the fluorocarbon particles precipitate in a state where they are disconnected from the surface of the diffusion medium. Typically, the liquid may be pulled 30–40 μm from the surface of the diffusion medium, so that the fluorocarbon particles "land" on the medium in a pattern that does not correspond to the preferred distribution characterized by C/F ratios described above. It is believed that the current method operates to produce diffusion media with desired C/F ratios in-part by heating the solids on the paper so that the fluorocarbon distribution is dictated by the structure of the surface and not by the velocity of air going by the surface. In one aspect, the invention calls for quiescent conditions such that they do not disturb the surface of the diffusion medium sufficient to cause particles in suspension as they dry from being displaced from the fibers.

The invention has been described with respect to some preferred embodiments. Further non-limiting examples of the invention and method for carrying it out are given in the examples that follow.

EXAMPLE 1

The EDS Analysis Procedure

Energy dispersive spectroscopy (EDS) detects and measures x-rays emitted from a sample subjected to an electron beam to determine the elemental composition of the sample. The presence of fluorine in the EDS spectrum of carbon paper of the invention arises solely from the presence of fluorocarbon on the paper surface. The other element of interest in a typical spectrum is carbon, arising from both the carbon paper and the fluorocarbon coating. Both the thickness and the distribution of fluorocarbon present on the porous paper surface can influence the EDS spectrum. A typical procedure to assess the fluorocarbon distribution, or C/F ratio is next described.

Scan three random locations within a sample not less than 1 cm in diameter. For example, samples may be taken at the four corner positions of the paper. This scan is to be performed on the side of the paper that will be in contact with the flow field in the fuel cell. The scan may be 1 mm by 1 mm at 20 keV accelerating potential, 35 microsecond amp time (time constant), and 20 live seconds. Standardless quantification is used to determine an atomic percent of fluorine in each scanned area. The raw data in atomic percent of fluorine and carbon are reported, as well as the standard deviation of the calculated CIF ratio. The data may be reported for each location scanned, and for the paper as a whole. At least one location scanned should give a C/F ratio in the preferred range. Preferably every location examined for a given paper has an average C/F ratio in the preferred ranges.

EXAMPLE 2

Example of a Microwave Drying Process

Fluoropolymer solution is prepared by diluting 1 part DuPont T30 solution into 19 parts deionized water by volume. T30 is a dispersion of 60% by weight PTFE, water, and surfactant. The diluted solution is stirred for about 5 minutes. Toray carbon paper (TGPH-060 or TGPH-090) is immersed into the solution for a time period of about 3 minutes up to about 5 minutes. The immersion time is not particularly critical. The paper is then removed from the solution and allowed to drip dry for about 1 minute. Again, the time is not particularly critical as long as excess solution is removed. The paper is then placed onto a glass tray in a microwave oven in a horizontal position with both sides of the paper exposed and subjected to microwave energy at 120 W until dry (approximately 20 minutes). The paper is then placed in a convection oven and the temperature ramped to 380° C. and held at that temperature for about 30 minutes. The paper surface is then examined utilizing EDS and it is found that every section of the paper examined has a C/F ratio between 9 and 13. The corresponding PTFE uptake is between 6.8% and 7.3% by weight.

EXAMPLE 3

Infrared Drying Procedure

DuPont T30 PTFE solution (60 weight percent PTFE) is diluted 1–20 using deionized distilled water. Toray 060 carbon fiber paper is dipped in the diluted PTFE bath for 4 minutes. The carbon fiber paper is then removed from the bath and allowed to drip dry for one minute. An infrared panel heater is used to dry the carbon fiber paper. The front of the IR heater is made of black cloth to enable homogeneous heating. The temperature on the wet carbon fiber paper surface can be adjusted using the IR heater power controller and by adjusting the distance from the heater from the paper. A 25 cm by 45 cm paper is laid on a rack after it is dipped into the PTFE solution. An IR panel heater with an area larger than the samples is placed about 60 cm above the carbon paper. Upon exposure of the paper to infrared radiation, the temperature on the sample surface is measured to be about 64° C. After 8 minutes of exposure, the paper is dry. Following drying, the paper is next sintered at 380° C. for 20 minutes. Six areas on the paper are sampled for analysis by EDS. The C/F ratio on the six sampled locations ranges from 9.5 to 10.5.

EXAMPLE 4

Performance Testing

Figure 4:
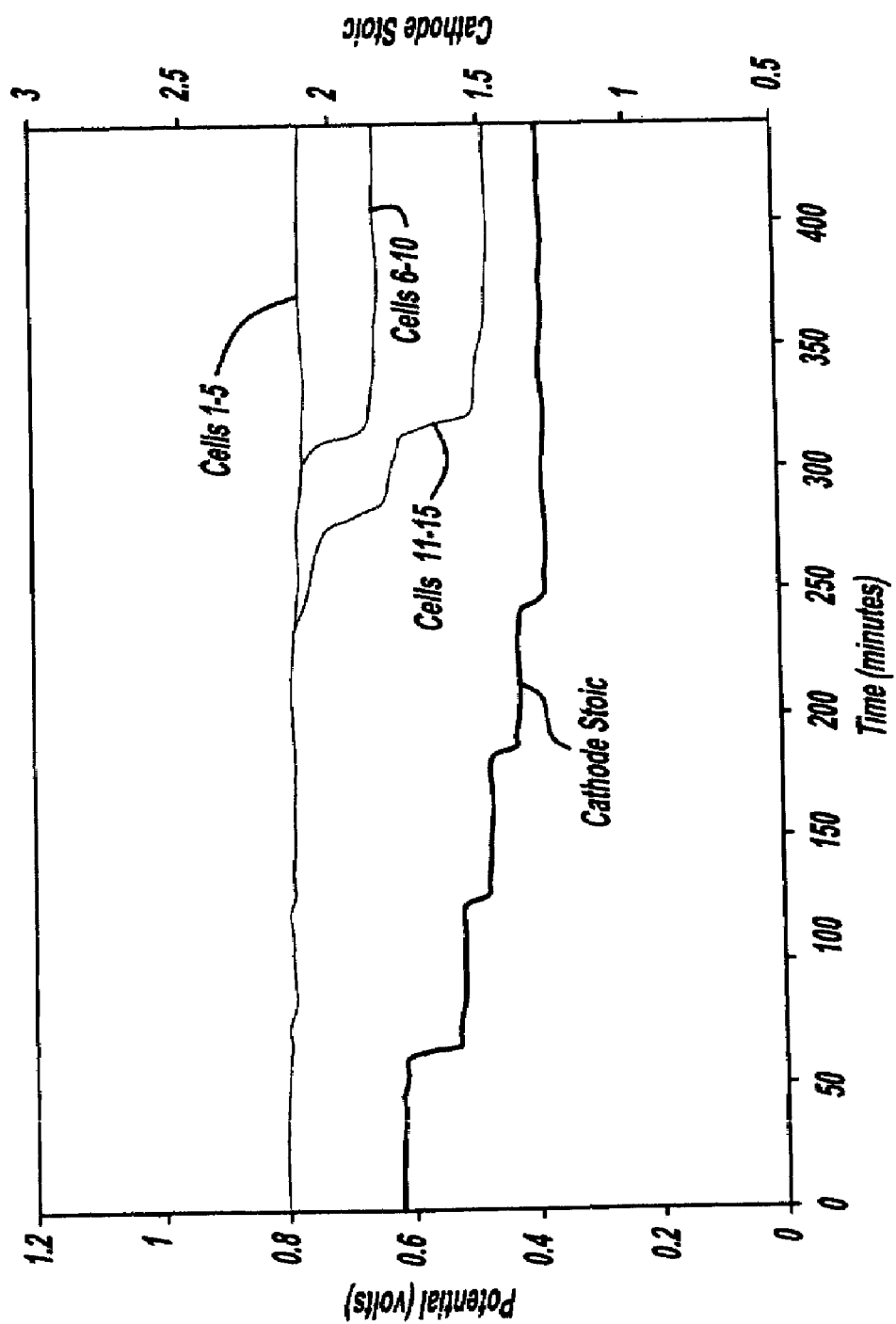
FIG. 4 is a graph of fuel cell performance of diffusion media.

A stack containing 15 cells (5 cells each of 3 different groups of papers) is subjected to a load of 0.1 A/cm² catalyst area. Cells 1–5 contain microwave processed Toray paper according to the invention. The other two groups of papers (6–10 and 11–15) contain commercially available carbon paper with a fluorocarbon coating from two different suppliers, respectively. The cathode stoichiometry is stepped down from a value of 1.8 in 0.2 or 0.1 unit increments until the potential of any given cell drops below 0.1 volts. FIG. 4 depicts the average potential of each of the three groups in 30 second increments at the stoichiometry indicated. As can be seen in FIG. 4, none of the cells with microwave processed paper exhibited a significant drop in potential out to 1.3 cathode stoichiometry, whereas the other two groups exhibited a substantial loss in performance at that same stoichiometry.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell stack comprising a plurality of fuel cells, each of the fuel cells comprising:
    an anode;
    a cathode;
    a proton exchange membrane disposed between the cathode and the anode;
    a flow field adjacent the cathode; and
    a fluororesin coated diffusion medium disposed between the cathode and the flow field with a first surface in contact with the cathode and a second surface exposed to the flow field;
    wherein each diffusion medium in the stack has a C/F ratio of 8 to 20 on the surface exposed to the flow field as measured by energy dispersive spectroscopy.

2. A fuel cell stack according to claim 1, wherein the C/F ratio is from 9 to 15.

3. A fuel cell stack according to claim 1, wherein the C/F ratio is from 9to 13.

4. A fuel cell stack according to claim 1, wherein upon operation over a stoic range of 1.3 to 1.8, the voltage of the fuel cell stack varies by less than 10%.

5. A method for operating a fuel cell stack according to claim 1 comprising providing hydrogen to the anode and oxygen to the cathode.

6. A method according to claim 5, wherein the voltage of the fuel cell varies by less than 10% over a stoic range of 1.3 to 1.8.

7. A fuel cell stack comprising a plurality of fuel cells, each of the fuel cells comprising:
    an anode;
    a cathode;
    a proton exchange membrane disposed between the cathode and the anode;
    a flow field adjacent the cathode; and
    a fluororesin coated diffusion medium disposed between the cathode and the flow field with a first surface in contact with the cathode and a second surface exposed to the flow field;
    wherein each diffusion medium in the stack has a C/F ratio of 8 to 20 on the surface exposed to the flow field as measured by energy dispersive spectroscopy; and
    wherein each diffusion medium is made by a process comprising:
        immersing a fiber based gas diffusion medium in an aqueous dispersion of fluororesin particles;
        removing the medium from the dispersion;
        drying the medium by a process comprising subjecting it to electromagnetic radiation of a wavelength above that of visible light at an intensity and for a time sufficient to remove water from the medium.

8. A fuel cell according to claim 7, wherein the electromagnetic radiation is microwave.

9. A fuel cell according to claim 7, wherein the electromagnetic radiation is infrared.

10. A fuel cell according to claim 7, wherein the fluororesin particles comprise tetrafluoroethylene.

11. A fuel cell stack comprising a plurality of fuel cells, each of the fuel cells comprising:
   an anode;
   a cathode;
   a proton exchange membrane disposed between the cathode and the anode;
   a flow field adjacent the cathode; and
   a fluororesin coated diffusion medium disposed between the cathode and the flow field with a first surface in contact with the cathode and a second surface exposed to the flow field,
   wherein each diffusion medium in the stack is made by a process comprising
   immersing a fiber based gas diffusion medium in an aqueous dispersion of fluororesin particles;
   removing the medium from the dispersion; and
   drying the medium by subjecting it to microwave radiation or infrared radiation for a time sufficient to remove water from the medium.

12. A fuel cell stack according to claim 11, in which the diffusion medium is prepared by subjecting it to microwave radiation.

13. A fuel cell stack according to claim 11, in which the diffusion medium is prepared by subjecting it to infrared radiation.

14. A fuel cell stack according to claim 11, wherein each diffusion medium in the stack has a CIF ratio of 8 to 20 on the surface exposed to the flow field as measured by energy dispersive spectroscopy.

15. A fuel cell stack according to claim 11, wherein each diffusion medium in the stack has a C/F ratio of 9 to 15 on the surface exposed to the flow field as measured by energy dispersive spectrascopy.

16. A fuel cell stack according to claim 11, wherein each diffusion medium in the stack has a C/F ratio of 9 to 13 on the surface exposed to the flow field as measured by energy dispersive spectroscopy.

* * * * *